US 6,602,132 B2

(12) United States Patent
Kozawa et al.

(10) Patent No.: US 6,602,132 B2
(45) Date of Patent: Aug. 5, 2003

(54) GAME SYSTEM AND COMPUTER-READABLE STORAGE MEDIUM CARRYING PROGRAM THEREFOR

(75) Inventors: Akira Kozawa, Nagoya (JP); Kengo Suzuki, Nagoya (JP); Seiji Akimoto, Nagoya (JP); Keiichi Hatakeyama, Nagoya (JP); Yasuhiro Masuoka, Nagoya (JP); Akihiro Shimizu, Nagoya (JP); Sadaharu Kawamura, Nagoya (JP); Akio Sakamoto, Nagoya (JP)

(73) Assignee: Konami Corporation, Tokyo (JP)

( * ) Notice: Subject to any disclaimer, the term of this patent is extended or adjusted under 35 U.S.C. 154(b) by 288 days.

(21) Appl. No.: 09/817,445

(22) Filed: Mar. 26, 2001

(65) Prior Publication Data

US 2001/0027127 A1 Oct. 4, 2001

(30) Foreign Application Priority Data

Mar. 31, 2000  (JP) ........................................ 2000-096041

(51) Int. Cl.[7] ................................................. A63F 9/24
(52) U.S. Cl. ............................................................ 463/7
(58) Field of Search ....................................... 463/7, 37

(56) References Cited

U.S. PATENT DOCUMENTS

| 5,542,672 | A | * | 8/1996 | Meredith ....................... 463/37 |
| 5,713,792 | A | * | 2/1998 | Ohzono et al. ................. 463/7 |
| 6,254,481 | B1 | * | 7/2001 | Jaffe ............................. 463/20 |
| 6,319,128 | B1 | * | 11/2001 | Miyoshi et al. ................ 463/31 |

FOREIGN PATENT DOCUMENTS

EP        0 916 375        5/1999

OTHER PUBLICATIONS

"Fisherman's Bait" 'ONLINE!, Jan. 31, 2000 (Jan. 31, 2000), XP002167905 Retrieved from the Internet: <URL:psx.fgn.com/reviews/11623.html> 'retrieved on May 21, 2000! * the whole document *.

Hattori K ; Narita Y ; Kashimori Y ; Kambara T : "Self–organized critical behavior of fish school and emergence of group" Proceedings of the International Conference on Neural Information Processing. vol. 2, Nov. 16–20, 1999, pp. 465–470, XP002222435 Perth, WA, Australia *p. 468, right–hand column, paragraph 4.1.1 –paragraph 4.1.2 *.

* cited by examiner

Primary Examiner—S. Thomas Hughes
Assistant Examiner—Corbett B. Coburn
(74) Attorney, Agent, or Firm—Jordan and Hamburg LLP

(57) ABSTRACT

A game system includes: a display device for displaying pictures; an input device for receiving input by a game-player and outputting a signal corresponding to the input; and a control device for controlling progress of a fishing game with referring to the signal outputted by the input device and displaying pictures corresponding to the progress of the game on the display device. The control device includes: a first determination unit for determining whether or not an imaginary fish is hooked and for outputting an affirmative result when the fish is hooked; a second determination unit for determining whether or not the hooked fish is a prey-fish and for outputting an affirmative result if the hooked fish is a prey-fish; a third determination unit for determining whether or not one or more predator-creature exists within a range from a position of the hooked fish and for outputting an affirmative result when the predator-creature exists; and a bite control unit for allowing the predator-creature to bite the hooked fish when all of the first, the second and the third determining unit output the affirmative results. Only if the first to third determination unit output affirmative results, the predator-creature comes out and makes double-bite.

7 Claims, 3 Drawing Sheets

GAME SYSTEM AND COMPUTER-READABLE STORAGE MEDIUM CARRYING PROGRAM THEREFOR

BACKGROUND OF THE INVENTION

1. Field of the Invention

The present invention relates to a fishing game system utilizing a computer.

2. Description of Related Art

There is known a fishing game system utilizing a computer, which shows the fishing field on a screen of a display device. The game-player manipulates the input device of the game system to cast the fishing rig with bait or lure in the fishing field, thereby imaginarily experiencing fishing. In such a fishing game, the game-player casts the fishing rig with bait or lure, sets the hook on a fish and lands it, and sees the kind and/or size of the fish thus caught. The game-player repeats those operations to enjoy imaginary fishing on the game.

In the real fishing, sometimes a fish bites bait or lure and hooked, and then another fish bites the hooked fish (Throughout this specification, the second bite by that another fish is called "double-bite"). Therefore, if such an unexpected situation is realized in the computer fishing game, the game-player may feel more pleasure in playing the fishing game. However, if the double-bite happens only incidentally in the fishing game, like the real fishing, the game becomes less amusing and tactic.

SUMMARY OF THE INVENTION

It is an object of the present invention to provide a fishing game system in which the game-player may tactically and deliberately make the double-bite happen by satisfying necessary conditions during the progress of the game.

According to one aspect of the present invention, there is provided a game system including: a display device for displaying pictures; an input device for receiving input by a game-player and outputting a signal corresponding to the input; and a control device for controlling progress of a fishing game with referring to the signal outputted by the input device and displaying pictures corresponding to the progress of the game on the display device, wherein the control device includes: a first determination unit for determining whether or not an imaginary fish is hooked and for outputting an affirmative result when the fish is hooked; a second determination unit for determining whether or not the hooked fish is a prey-fish and for outputting an affirmative result if the hooked fish is a prey-fish; a third determination unit for determining whether or not one or more predator-creature exists within a range from a position of the hooked fish and for outputting an affirmative result when the predator-creature exists; and a bite control unit for allowing the predator-creature to bite the hooked fish when all of the first, the second and the third determining unit output the affirmative results. In accordance with the game system thus configured, only if the first to third determination unit output affirmative results, the predator-creature comes out and makes double-bite.

The game system may further include a fourth determination unit for determining whether or not presence of predator-creatures which prey on the prey-fishes is notified to the game-player in the progress of the game and for outputting an affirmative result when the presence is notified, wherein the bite control unit allows the predator-creature to bite when all of the first to fourth determining unit output the affirmative results. Thus, the predator-creature comes out only if the game-player knows the presence of the predator-creature, thereby making the story of the game more interesting.

The bite control unit may include: a re-determination unit for allowing the second and the third determination unit to make re-determination by regarding the biting predator-creature as the hooked fish when the biting predator-creature is a prey for another predator-creature; and a unit for allowing the another predator-creature to bite the biting predator-creature when both of the second and the third determination unit output the affirmative results for the re-determination. Thus, a predator-creature may further bite the predator-creature that has bitten the prey-fish.

The bite control unit may include an additional determination unit for executing determination for additional conditions in addition to the determination executed by the first to fourth determination unit, and allows the predator-creature to bite the hooked fish when all of the first to fourth determination unit and the additional determination unit output the affirmative results. Thus, the conditions for causing the double-bite may be changed as needed.

The fourth determination unit may notify the game-player of the presence of the predator-creature by showing presence of a prey-fish which body is partially bit off. By this, presence of the predator-creature may be notified to the game-player naturally and suggestively.

The bite control unit may output a warning before allowing the predator-creature to bite the hooked fish. This enables the game-player to prepare for such an irregular situation that a creature bites a fish biting bait or lure.

According to another aspect of the present invention, there is provided a computer-readable storage medium carrying game program for controlling a game system to execute a fishing game with referring to a signal outputted by an input device of the game system and displaying pictures corresponding to the progress of the game on a display device, the program controls the game system to function as: a first determination unit for determining whether or not a fish is hooked and for outputting an affirmative result when the fish is hooked; a second determination unit for determining whether or not the hooked fish is a prey-fish and for outputting an affirmative result if the hooked fish is a prey-fish; a third determination unit for determining whether or not one or more predator-creature exists within a range from a position of the hooked fish and for outputting an affirmative result when the predator-creature exists; and a bite control unit for allowing the predator-creature to bite the hooked fish when all of the first, the second and the third determining unit output the affirmative results.

In accordance with the storage medium, when it is read out and executed by the computer, the computer may function as a control device in the game system of the present invention. It is noted that the storage medium may be a magnetic storage medium, an optical storage medium, a magneto-optical storage medium, a semiconductor storage elements and other various storage means.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

Figure 1:
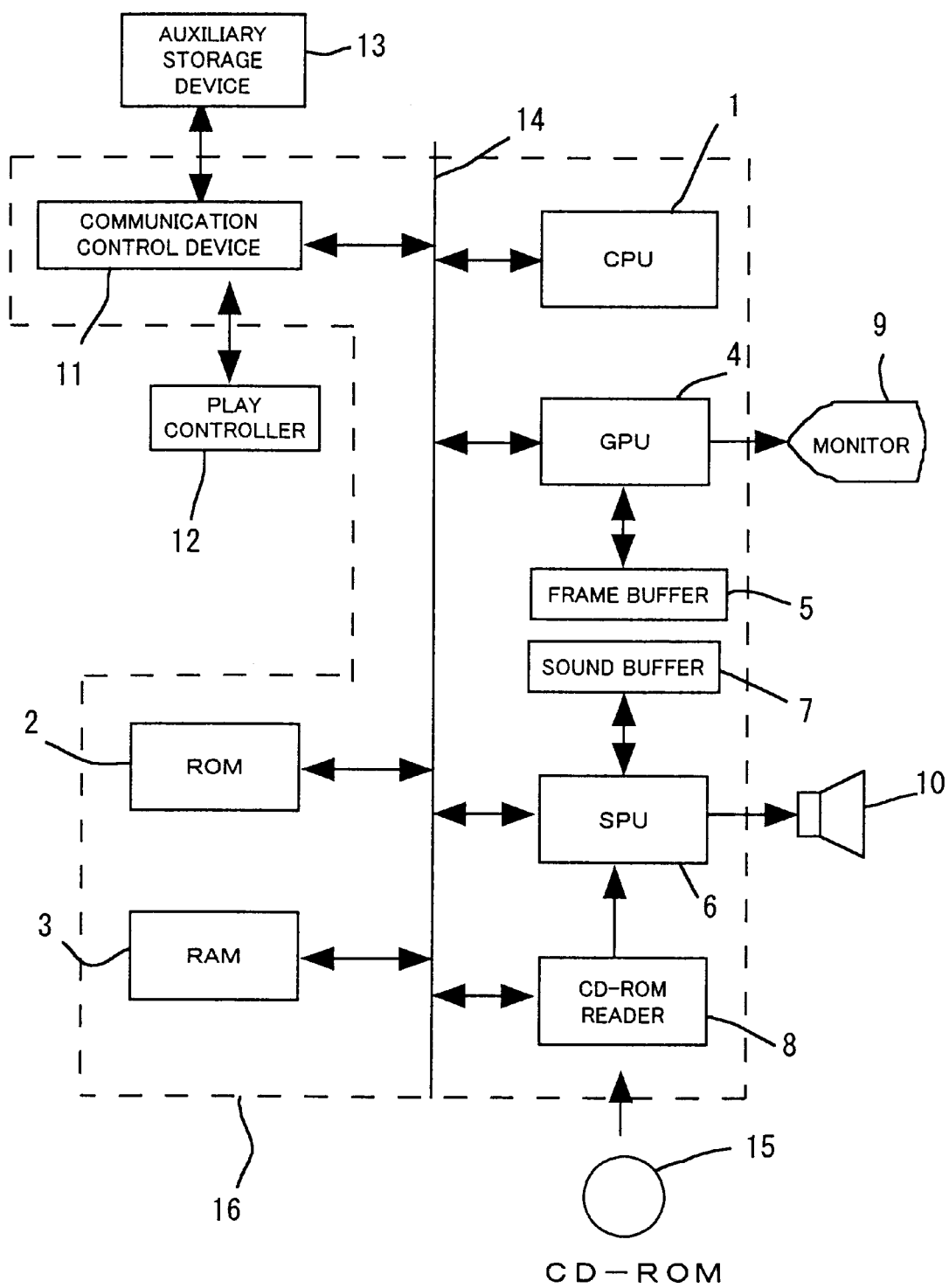
FIG. 1 is a block diagram showing a control unit of a fishing game system according to the present invention.

FIG. 1 is a block diagram showing a control unit of a fishing game system according to the present invention. This game system executes the game by executing the game program recorded on the CD-ROM 15 serving as a storage medium.

The game system mainly configured by a game machine 16, which includes a CPU 1 mainly configured by a microprocessor, a ROM 2 and a RAM 3 serving as main memory devices for the CPU 1, a graphics processing unit (GPU) 104 and a sound processing unit (SPU) 6 for executing processing required to output visual pictures and sound, buffers 5 and 7 for the above units 4 and 6, and a CD-ROM reader 8. The ROM 2 stores operating system which functions as necessary program for the overall control of the game machine 16. Game programs and data read out from the CD-ROM 15 is written into the RAM 3 as necessary. The GPU 4 receives picture data from the CPU 1 and writes it into the frame buffer 5, converts the picture data to a video signal and outputs it to the monitor 9 at appropriate timings. The SPU 6 reproduces voice and music data as well as music-source data, which are read out from the CD-ROM 15 and stored in the sound buffer 7, so that corresponding sound is outputted by the speaker 10. The CD-ROM reader 8 reads out necessary programs and data from the CD-ROM 15 according to the instruction by the CPU 1, and outputs signals corresponding to the programs and data thus read out. The CD-ROM 15 stores programs and data necessary for the execution of the game. Generally, a television receiver for home use is used as the monitor 9, and a loudspeaker provided in the television receiver is used as the loudspeaker 10.

Moreover, a communication control device 11 is connected via a bus 14 to the CPU 1, and a play controller 12 and the auxiliary storage device 13 are detachably connected to the CPU 1 via the communication control device 11. The play controller 12 functions as an input device manipulated by a game-player who plays the game. The play controller 12 includes operation members which are to be manipulated by the game-player The communication control device 11 scans the state of the operation members of the play controller 12 at a fixed cycle (e.g. 1/60 second), and outputs signals in correspondence with the scanning result to the CPU 1. Based on that signal, the CPU 1 judges the state of the play controller 12. A plurality of controllers 12 and auxiliary storage units 13 may be connected to the communication control device 11 in parallel, at the same time. Various kinds of devices may be used as the play controller 12.

With the above-described configuration, the components other than the monitor 9, the speaker 10, the play controller 12, the CD-ROM 15 and the auxiliary storage unit 13 are all accommodated in a single housing to constitute the home game machine 16. The controller 12 may have various configurations.

Next, the double-bite process according to the present invention will be described below. In this invention, if predetermined conditions are satisfied in the progress of the game, the double-bite happens and a fish bites another fish which is being hooked.

As a premise for the double-bite, it is necessary that prey-predator relationship exists in the ecosystem set in the fishing game. For instance, it is assumed that fishes of three types, i.e., A-type, B-type and C-type, live in a certain lake. There is such a prey-predator relationship that A-type fishes prey on B-type fishes, and B-type fishes prey on C-type fishes (i.e., A>B>C). It is noted that, if A-type fishes prey on B-type fishes, A-type fishes are called "predator fishes" and B-type fishes are called "prey fishes".

If an A-type fish is hooked on bait or lure, the double-bite never happens because A-type fishes are not prey fishes. If a B-type fish is hooked on bait or lure and an A-type fish, which is a predator-fish for the B-type fish, is near the B-type fish, the A-type fish may possibly double-bite the B-type fish. However, if there is no A-type fish around the B-type fish and only B-type and C-type fishes are around the B-type fish, the double-bite never happens.

If a C-type fish is hooked on bait or lure and a B-type fish, which is a predator-fish for the C-type fish, is near the C-type fish, the B-type fish may possibly double-bite the C-type fish. However, if there is no B-type fish around the C-type fish, and only A-type and C-type fishes exist around the C-type fish, no double-bite happens. It is noted that A-type fishes do not bite C-type fishes because C-type fishes are not prey-fishes for A-type fishes.

In the case that a B-type fish double-bites a C-type fish and is also being hooked, if there is an A-type fish, which is predator-fish for the B-type fish, around the double-biting B-type fish, the A-type fish may possibly bite the B-type fish (this is called "triple-bite").

On the premise that the above-mentioned ecosystem is set in the game, the conditions for causing the double-bite are as follows.

[1] Essential Conditions
  (A) A fish is hooked when the game-player is fishing by using bait or lure.
  (B) The hooked fish is a prey-fish mentioned above in the ecosystem set in the game.
  (C) There is one or more predator-fish around the hooked prey-fish.
  (D) The game-player has been notified in the progress of the game that there is prey-predator relationship in the ecosystem set in the game. Namely, the game-player is notified in a certain way that predator-fishes exist. For example, the game-player may be directly notified the presence of the predator-fishes from talks and/or comments with people appearing in the game progress. In such a case, the fact that the game-player got such hearsay from plural people in the game may be a condition for causing the double-bite. Alternatively or additionally, the presence of the predator-fishes may also be notified to the game-player indirectly and suggestively by, for example, showing a prey-fish, a part of which is bit off, to the game-player.

[2] Additional Conditions
  In addition to the above essential conditions, the following additional conditions may be arbitrarily used.
  (a) The hooked fish is larger than a predetermined size.
  (b) The hooked fish made predetermined action.
  (c) The hooked fish moved into a predetermined area in the fishing field.
  (d) The fish was hooked under a special condition (e.g., double-bite, triple-bite).

(e) The hooked state is lasting for more than a predetermined time period.
(f) The number of hooked fishes is more than a predetermined number.
(g) The fish was hooked with a special or a certain lure.
(h) The fish was hooked with a special item (e.g., rod, line, etc.).
(i) The game-player is playing a special or a certain stage.
(j) The game-player is playing a stage under certain atmospheric condition (e.g., weather, temperature, water temperature, wind speed, wind direction, season, etc.).
(k) Specific conditions for a certain fish (e.g., spawning season, territory of the fish, high-pressure area, etc.) are satisfied at the same time.
(l) A specific condition (A certain stage has been cleared, the result of a certain stage is excellent, etc.) is satisfied.
(m) The game-player made predetermined action (e.g., lure retrieving action, rod action, etc.) before and/or after the hooking.
(n) The double-bite causing condition associated with random number is satisfied.

In the present invention, it is monitored whether or not the above-mentioned conditions are satisfied or not in the progress of the game. Only when all of the essential conditions and some of the additional conditions are satisfied at the same time, a predator-fish appears in the game story and the double-bite happens. One specific method is as follows. Each of the above-mentioned conditions is assigned with a flag, and the states of the flags are stored in the RAM 3 as attribute information for a game-player. The initial value of each flag is set to "0", and the flag is changed to "1" if the condition is satisfied in the progress of the game. Thus, the double-bite is caused if all four flags for the essential conditions and the flags for predetermined ones of the additional conditions become "1".

Next, the double-bite process according to the present invention will be described with reference to FIG. 2. It is noted that the following process is achieved by the CPU 1 which executes the game program recorded on the CD-ROM 15 to control the GPU 4, the controller 12 and other components of the game machine 16.

Figure 3A:
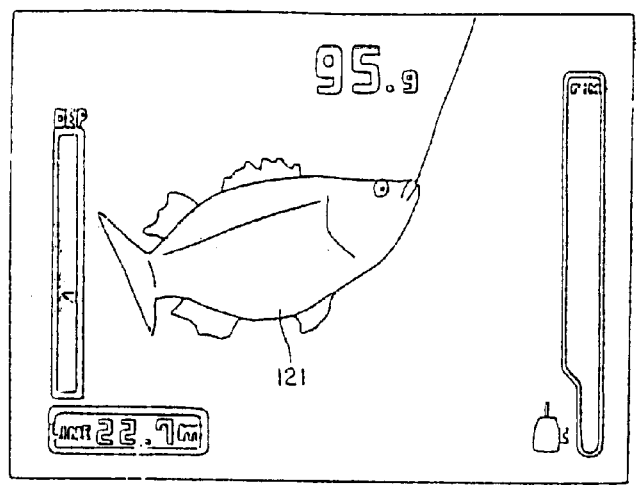
FIGS. 3A to 3C are examples of pictures shown to the game-player during the process of FIG. 2.

First, the game-player does fishing in a normal situation in the game (step S2). Then, it is determined whether or not a fish is hooked (i.e., Essential Condition (A)) (step S4). If a fish is hooked, the hooked state of the fish is shown on the monitor 9 as shown in an example of FIG. 3A (step S6). Thus, the game-player is able to know the kind of the hooked fish.

Subsequently, it is determined whether or not the game-player has been notified that the hooked fish is a prey-fish (i.e., Essential Condition (B)) (step S8). This notification may be made in various ways mentioned above. The flags may be set such that the double-bite takes place only if the notification is made to the game-player in all ways. Alternatively, the flags may be set such that the double-bite takes place if the notification is made in one or more of the various ways.

If the notification has not been completed yet, the process goes to a normal landing process (step S18), wherein the fish is landed after the fighting, and the picture of the landed fish is shown on the monitor 9. Then, the process goes back to step S2 and the game-player continues fishing.

On the other hand, if the notification has been completed, it is determined whether or not the fish being hooked is a prey-fish (step S10). According to the above-mentioned example of the ecosystem, if the fish being hooked is A-type fish, no double-bite takes place and the process goes to the normal landing process (step S18) because A-type fish is not prey fish. On the other hand, if the fish being hooked is B-type or C-type fish, step S10 results in Yes because they are prey-fishes. If step S10 result in Yes, it is determined whether or not a predator-fish for the fish being hooked exists within a predetermined range from the position of the fish being hooked (step S12). According to the game program, the CPU 1 recognizes and memorizes data indicating the presence/absence, position and kind of fishes within the fishing field the game-player is fishing. The CPU 1 refers to the data to determine whether or not a predator-fish exists within a predetermined distance range from the fish being hooked. For example, if a B-type fish is being hooked, it is determined whether or not an A-type fish exists in the predetermined range.

If there is no predator-fish in the predetermined range, the process goes to step S18 to execute normal landing process. On the other hand, if there is a predator-fish, it is determined whether or not the additional conditions are satisfied (step S14). Namely, it is determined whether or not predefined some additional conditions are satisfied. For example, an additional condition (e) that the hooked state of the fish continues for more than a predetermined time period may be used. After the above-mentioned notification relating to the presence of predator fish is made, the game-player has certain knowledge about the prey-predator relationship existing in the fishing area and knows which fish is a prey fish. Since the fish being hooked is shown to the game-player like FIG. 3A in step S6, the game-player can discriminate the kind of the fish and can let the hooked fish swim for a while without landing it, expecting a predator-fish comes around and double-bites the hooked fish if the hooked fish is a prey-fish. Therefore, by utilizing the additional condition (e) that the hooked state continues for more than a predetermined time period, the game-player may deliberately attempt to cause double-bite.

If any predetermined one of the additional conditions is not satisfied yet, the process goes to step S18 to execute normal landing process. On the other hand, if all of the predetermined additional conditions are satisfied, the double-bite process is executed (step S16).

Figure 3B:
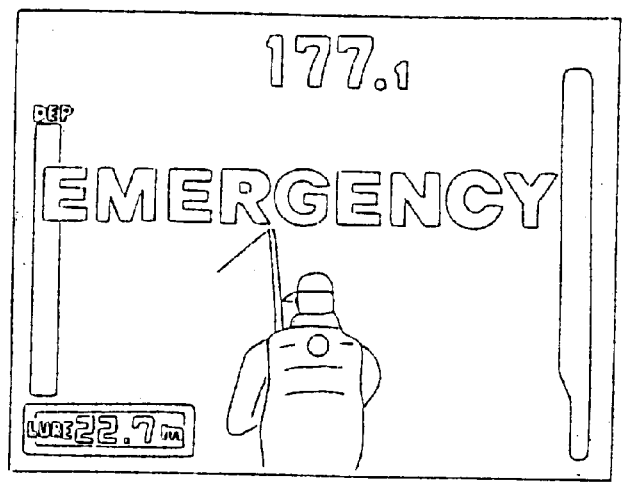

In the double-bite process, first the game-player is given a warning that a predator-fish for the fish being hooked is approaching. This warning may be done visually as shown in FIG. 3B, and/or may be done acoustically by generating certain sound. In the story of the game, the predator-fish may possibly be a gigantic fish, it is effective to give the warning and let the game-player expect the forthcoming fight with the gigantic predator-fish.

Figure 3C:
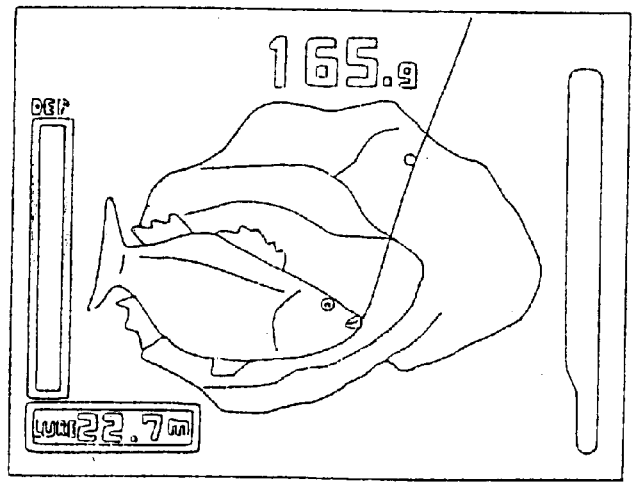

Subsequently, as shown in FIG. 3C, the scene the predator-fish approaches and bites the prey-fish is shown to the game-player. The game-player makes fight with the predator-fish, and then the predator-fish is landed. The scene of the fight, landing and the landed fish are shown to the game-player on the monitor 9.

Figure 2:
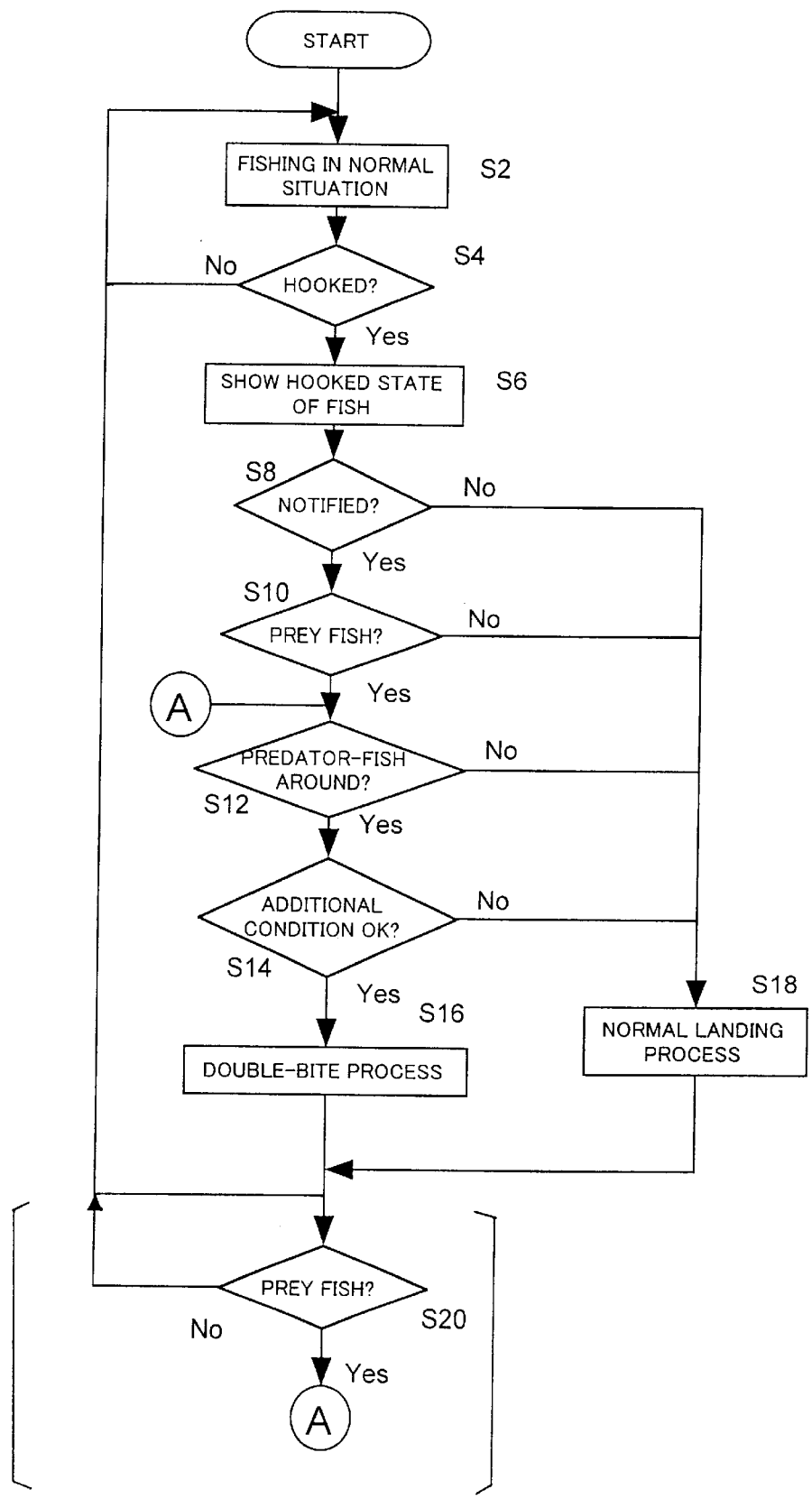
FIG. 2 is a flowchart showing double-bite process according to the fishing game system of the present invention.

Furthermore, as shown in the bracket of FIG. 2, step S20 may be executed, wherein the presence of a predator-fish for the fish hooked by the double-bite is checked (e.g., if a B-type fish double-bites a C-type fish, an A-type fish may further double-bite the B-type fish). If a further predator-fish exists, the process may jump to step S12 to again let the double-bite (triple-bite, in this case) happen.

In the above description, the conditions for causing the double-bite include four essential conditions and some additional conditions. However, some other conditions may be introduced to the essential condition, and some of the four essential conditions may be used as additional conditions. Further, in the story of the game, any living creature other than fish (including both real creatures existing in real world and imaginary creature) may bite the prey-fish hooked.

As described above, according to the present invention, the game-player may deliberately and tactically cause the double-bite to some extent by getting the knowledge that double-bite can occur, by investigating the conditions for causing the double-bite and by advancing the game to satisfy the conditions. Those conditions are not directly notified to the game-player, but gradually become clear to the game-player as the game advances. The game-player needs to make reasoning and repeatedly make trial and error process to finally cause the double-bite. This can add high-degree of amusing and tactical enjoyment to a fishing game in which the game-player simply catches fishes and competes kinds and/or size of the fishes caught.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2000-096041 filed on Mar. 31, 2000 including the specification, claims, drawings and summary is incorporated herein by reference in its entirety.

What is claimed is:

1. A game system comprising:

a display device for displaying pictures;

an input device for receiving input by a game-player and outputting a signal corresponding to the input; and a control device for controlling progress of a fishing game with referring to the signal outputted by the input device and displaying pictures corresponding to the progress of the game on the display device, wherein the control device comprises:

a first determination means for determining whether or not an imaginary fish is hooked and for outputting an affirmative result when the fish is hooked;

a second determination means for determining whether or not the hooked fish is a prey-fish and for outputting an affirmative result if the hooked fish is a prey-fish;

a third determination means for determining whether or not one or more predator-creature exists within a range from a position of the hooked fish and for outputting an affirmative result when the predator-creature exists; and a bite control means for allowing the predator-creature to bite the hooked fish when all of the first, the second and the third determining means output the affirmative results.

2. The game system according to claim 1, further comprising a fourth determination means for determining whether or not presence of predator-creatures which prey on the prey-fishes is notified to the game-player in the progress of the game and for outputting an affirmative result when the presence is notified, wherein the bite control means allows the predator-creature to bite when all of the first to fourth determining means output the affirmative results.

3. The game system according to claim 1, wherein the bite control means comprises:

a re-determination means for allowing the second and the third determination means to make re-determination by regarding the biting predator-creature as the hooked fish when the biting predator-creature is a prey for another predator-creature; and a means for allowing the another predator-creature to bite the biting predator-creature when both of the second and the third determination means output the affirmative results for the re-determination.

4. The game system according to claim 2, wherein the bite control means comprises an additional determination means for executing determination for additional conditions in addition to the determination executed by the first to fourth determination means, and allows the predator-creature to bite the hooked fish when all of the first to fourth determination means and the additional determination means output the affirmative results.

5. The game system according to claim 2, wherein the fourth determination means notifies the game-player of the presence of the predator-creature by showing presence of a prey-fish which body is partially bit off.

6. The game system according to claim 1, wherein the bite control means outputs a warning before allowing the predator-creature to bite the hooked fish.

7. A computer-readable storage medium carrying game program for controlling a game system to execute a fishing game with referring to a signal outputted by an input device of the game system and displaying pictures corresponding to the progress of the game on a display device, the program controls the game system to function as:

a first determination means for determining whether or not a fish is hooked and for outputting an affirmative result when the fish is hooked;

a second determination means for determining whether or not the hooked fish is a prey-fish and for outputting an affirmative result if the hooked fish is a prey-fish;

a third determination means for determining whether or not one or more predator-creature exists within a range from a position of the hooked fish and for outputting an affirmative result when the predator-creature exists; and a bite control means for allowing the predator-creature to bite the hooked fish when all of the first, the second and the third determining means output the affirmative results.

* * * * *